(12) United States Patent
Dillard

(10) Patent No.: US 10,378,451 B2
(45) Date of Patent: Aug. 13, 2019

(54) LARGE DISPLACEMENT HIGH TEMPERATURE SEAL

(71) Applicant: United Technologies Corporation, Hartford, CT (US)

(72) Inventor: Gary J. Dillard, Brownsboro, AL (US)

(73) Assignee: United Technologies Corporation, Farmington, CT (US)

( * ) Notice: Subject to any disclaimer, the term of this patent is extended or adjusted under 35 U.S.C. 154(b) by 512 days.

(21) Appl. No.: 14/913,215

(22) PCT Filed: Sep. 10, 2014

(86) PCT No.: PCT/US2014/054986
§ 371 (c)(1),
(2) Date: Feb. 19, 2016

(87) PCT Pub. No.: WO2015/080779
PCT Pub. Date: Jun. 4, 2015

(65) Prior Publication Data
US 2016/0201566 A1    Jul. 14, 2016

Related U.S. Application Data

(60) Provisional application No. 61/877,665, filed on Sep. 13, 2013.

(51) Int. Cl.
| *F02C 7/28* | (2006.01) |
| *F02K 1/80* | (2006.01) |
| *F01D 25/30* | (2006.01) |
| *F02K 1/82* | (2006.01) |
| *F01D 11/00* | (2006.01) |

(Continued)

(52) U.S. Cl.
CPC .............. *F02C 7/28* (2013.01); *F01D 11/005* (2013.01); *F01D 25/30* (2013.01); *F02K 1/805* (2013.01); *F02K 1/82* (2013.01); *F02K 1/825* (2013.01); *F16J 15/021* (2013.01); *F16J 15/06* (2013.01); *F05D 2220/32* (2013.01); *F05D 2220/90* (2013.01); *F05D 2240/12* (2013.01); *F05D 2240/55* (2013.01); *F05D 2250/12* (2013.01);
(Continued)

(58) Field of Classification Search
CPC .......... F02K 1/805; F02K 1/82; F01D 11/005; F01D 25/30; F02C 7/28; F16J 15/021; F05D 2240/55
See application file for complete search history.

(56) References Cited

U.S. PATENT DOCUMENTS 3,020,185 A    2/1962  Moffitt et al.
3,986,687 A   10/1976  Beavers et al.
(Continued)

OTHER PUBLICATIONS

EP search report for EP14866582.1 dated Sep. 1, 2016.

*Primary Examiner* — Carlos A Rivera
(74) *Attorney, Agent, or Firm* — O'Shea Getz P.C.

(57) ABSTRACT

A seal assembly is provided for a gas turbine engine. This seal assembly includes a tadpole seal with a bulb and a tail, where the tail is directed toward a backwall. The seal assembly also includes a faying extension that at least partially extends into the channel and into contact with the bulb. An exhaust duct is also provided for a gas turbine engine. This exhaust duct includes a seal assembly between a first exhaust duct section and a second exhaust duct section. The seal assembly includes a tadpole seal with a bulb and a tail, where the tail is directed upstream.

14 Claims, 9 Drawing Sheets

(51) Int. Cl.
*F16J 15/02* (2006.01)
*F16J 15/06* (2006.01)

(52) U.S. Cl.
CPC ......... *F05D 2250/14* (2013.01); *Y02T 50/671* (2013.01)

(56) References Cited

U.S. PATENT DOCUMENTS

| | | | |
|---|---|---|---|
| 4,132,068 A | 1/1979 | Johnston | |
| 4,441,726 A | 4/1984 | Uhl | |
| 4,575,099 A * | 3/1986 | Nash | F02K 1/805 239/265.37 |
| 5,104,286 A * | 4/1992 | Donlan | F01D 25/30 277/641 |
| 5,251,917 A * | 10/1993 | Chee | B64D 27/00 244/129.1 |
| 6,170,831 B1 | 1/2001 | Bouchard | |
| 6,318,668 B1 | 11/2001 | Ulanoski et al. | |
| 6,352,211 B1 | 3/2002 | Bentley | |
| 6,382,559 B1 | 5/2002 | Sutterfield et al. | |
| 7,818,957 B2 | 10/2010 | Corsmeier | |
| 7,861,535 B2 | 1/2011 | Figueroa et al. | |
| 7,966,823 B2 | 6/2011 | Koshoffer et al. | |
| 8,015,996 B2 | 9/2011 | Sadil et al. | |
| 8,205,821 B2 | 6/2012 | Peck | |
| 8,317,126 B2 | 11/2012 | Harris et al. | |
| 8,360,361 B2 | 1/2013 | Wadley et al. | |
| 2005/0235630 A1* | 10/2005 | Cuva | F02K 1/805 60/266 |
| 2005/0242525 A1 | 11/2005 | Dahlke et al. | |
| 2006/0277922 A1 | 12/2006 | Durocher et al. | |
| 2009/0127806 A1* | 5/2009 | Sternberger | F02K 1/1207 277/628 |
| 2009/0208326 A1 | 8/2009 | Durocher et al. | |
| 2010/0199583 A1 | 8/2010 | Behrens et al. | |
| 2013/0091864 A1* | 4/2013 | Auzelyte | F23J 13/04 60/798 |
| 2014/0265161 A1* | 9/2014 | Sutterfield | F02K 1/805 277/642 |

* cited by examiner

LARGE DISPLACEMENT HIGH TEMPERATURE SEAL

CROSS-REFERENCE TO RELATED APPLICATION

This application claims priority to PCT Patent Application No. PCT/US2014/054986 filed Sep. 10, 2014, which claims priority to U.S. Provisional Application No. 61/877,665 filed Sep. 13, 2013, which are hereby incorporated herein by reference in their entireties.

BACKGROUND

The present disclosure relates to a seal assembly, and more particularly to a seal assembly for a gas turbine engine exhaust duct.

Certain air vehicle architectures mount a gas turbine engine and a nozzle section therefor directly to airframe structure. Such mount arrangements require that thermal growth is primarily accommodated by an exhaust duct section between the engine and the nozzle section. Seal assemblies for such an exhaust duct may need to accommodate both radial and axial displacements over widely variable temperature and pressure ranges which have heretofore required a relatively complicated seal assembly.

SUMMARY

A seal assembly for a gas turbine engine, according to one disclosed non-limiting embodiment of the present disclosure, includes a channel with a backwall. The seal also includes a tadpole seal and a faying extension. The tadpole seal has a bulb and a tail. The tail is directed toward the backwall. The faying extension at least partially extends into the channel and into contact with the bulb.

In a further embodiment of the present disclosure, the bulb seals to the channel.

In a further embodiment of any of the foregoing embodiments of the present disclosure, the channel is annular.

In a further embodiment of any of the foregoing embodiments of the present disclosure, the tadpole seal includes fused end sections.

In a further embodiment of any of the foregoing embodiments of the present disclosure, the channel defines at least one port upstream of the bulb.

In a further embodiment of any of the foregoing embodiments of the present disclosure, the tadpole seal defines a ring.

In a further embodiment of any of the foregoing embodiments of the present disclosure, the tadpole seal includes a silica cover wrapped around an Inconel mesh bulb core.

An exhaust duct for a gas turbine engine, according to another disclosed non-limiting embodiment of the present disclosure, includes a first exhaust duct section and a second exhaust duct section adjacent to the first exhaust duct section. The exhaust duct also includes a seal assembly between the first exhaust duct section and the second exhaust duct section. The seal assembly includes a tadpole seal with a bulb and a tail, where the tail is directed upstream.

In a further embodiment of any of the foregoing embodiments of the present disclosure, a channel is included and mounted to the first exhaust duct section. The tadpole seal is located within the channel.

In a further embodiment of any of the foregoing embodiments of the present disclosure, the tail extends toward a backwall of channel.

In a further embodiment of any of the foregoing embodiments of the present disclosure, a faying extension is included that at least partially extends into the channel and into contact with the bulb.

In a further embodiment of any of the foregoing embodiments of the present disclosure, the channel defines at least one port upstream of the bulb.

In a further embodiment of any of the foregoing embodiments of the present disclosure, the tadpole seal defines a ring.

In a further embodiment of any of the foregoing embodiments of the present disclosure, the tadpole seal includes laser cut end sections.

A method of sealing an exhaust duct for a gas turbine engine, according to another disclosed non-limiting embodiment of the present disclosure, includes locating a tadpole seal with a bulb and a tail within a channel, where the tail is directed upstream.

In a further embodiment of any of the foregoing embodiments of the present disclosure, the method includes at least partially compressing the seal with a faying extension that at least partially extends into the channel and into contact with the bulb.

In a further embodiment of any of the foregoing embodiments of the present disclosure, the method includes directing the channel axially aft from a first exhaust duct section and the faying extension axially forward from a second exhaust duct section.

In a further embodiment of any of the foregoing embodiments of the present disclosure, the method includes pressure balancing the tadpole seal within the channel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
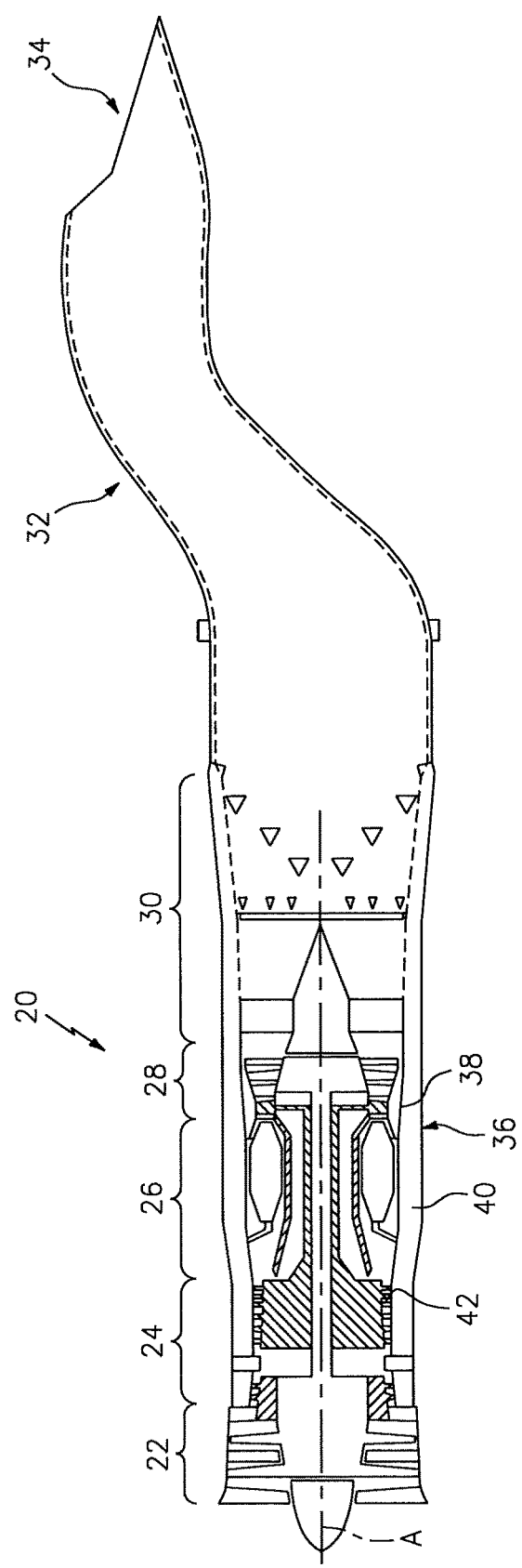
FIG. 1 is a general schematic view of an exemplary gas turbine engine for use with the present disclosure.
Figure 2:
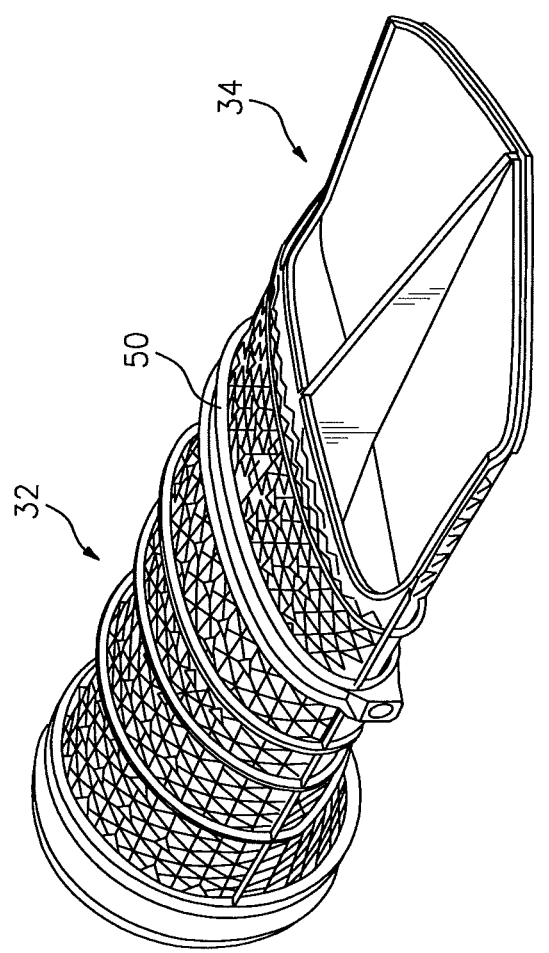
FIG. 2 is a perspective view of an exhaust duct section of the gas turbine engine of FIG. 1.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28 and an augmenter section 30 along a central longitudinal engine axis A. The gas turbine engine 20 is mounted to an exhaust duct section 32 and a nozzle section 34 (see also FIG. 2).

Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alter a bypass ratio during flight to achieve countervailing objectives such as high specific thrust for high-energy maneuvers yet optimizes fuel efficiency for cruise and loiter operational modes.

An outer structure 36 and an inner structure 38 define a generally annular secondary airflow path 40 around a core primary airflow path 42. Various structure and modules may define the outer structure 36 and the inner structure 38 which essentially define an exoskeleton to support the rotational hardware therein.

Air that enters the fan section 22 is divided between a primary airflow through the primary airflow path 42 and a secondary airflow through the secondary airflow path 40. The primary airflow passes through the combustor section 26, the turbine section 28, then the augmentor section 30 where fuel may be selectively injected and burned to generate additional thrust through the nozzle section 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein is any airflow different from the primary airflow. The secondary airflow may ultimately be at least partially injected into the primary airflow path 42 adjacent to the exhaust duct section 32 and the nozzle section 34.

Figure 3:
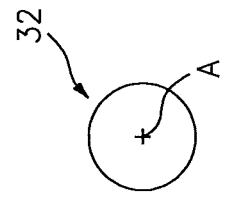
FIG. 3 is a lateral cross section of an exhaust duct according to one non-limiting embodiment.
Figure 4:
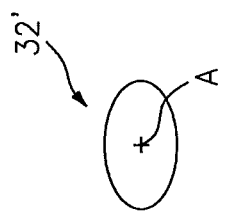
FIG. 4 is a lateral cross section of an exhaust duct according to one non-limiting embodiment.
Figure 5:
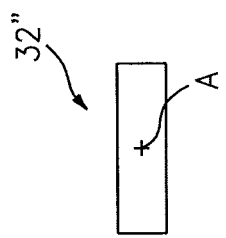
FIG. 5 is a lateral cross section of an exhaust duct according to one non-limiting embodiment.

The exhaust duct section 32 may be circular in cross-section (see FIG. 3) as typical of an axis-symmetric augmented low bypass turbofan. In another disclosed non-limiting embodiment, the exhaust duct section 32' may be non-axisymmetric in cross-section to include, but not be limited to, an oval cross-section (see FIG. 4) or a rectilinear cross-section (see FIG. 5). In addition to the various cross-sections, the exhaust duct section 32' may be non-linear with respect to the central longitudinal engine axis A to form, for example, a serpentine shape to block direct view to the turbine section 28 (see FIG. 1). Furthermore, in addition to the various cross-sections and the various longitudinal shapes, the nozzle section 34 may include, for example, a convergent/divergent nozzle, a non-axisymmetric two-dimensional (2D) vectorable nozzle, a flattened slot convergent nozzle of high aspect ratio or other geometry.

Figure 7:
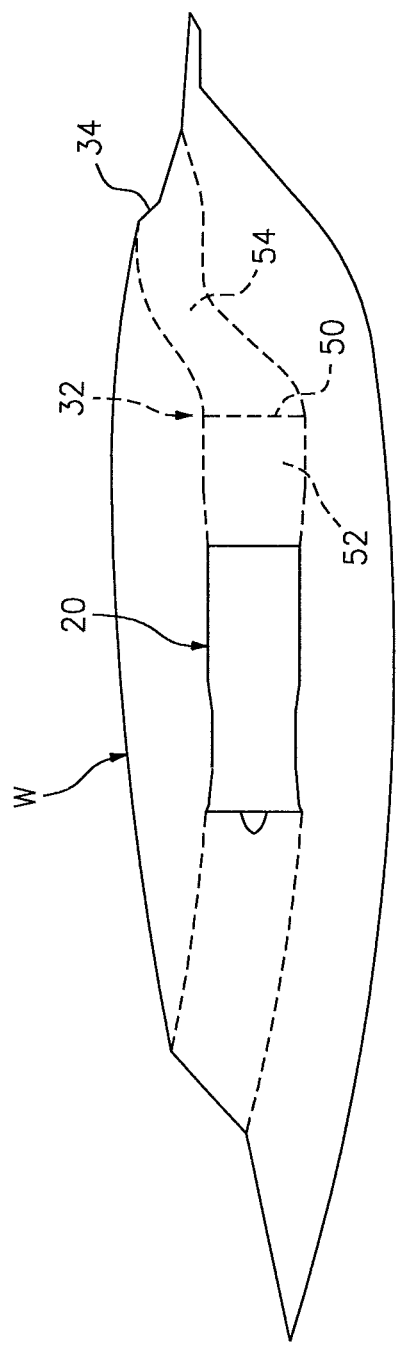
FIG. 7 is a schematic view of an air vehicle with an embedded engine and exhaust duct arrangement.

The engine 20 may be embedded within and mounted to an airframe W (illustrated schematically in FIG. 7) remote from the nozzle section 34 which is also mounted to the airframe W. Such a direct mount arrangement requires that thermal growth be accommodated within the exhaust duct section 32.

Figure 6:
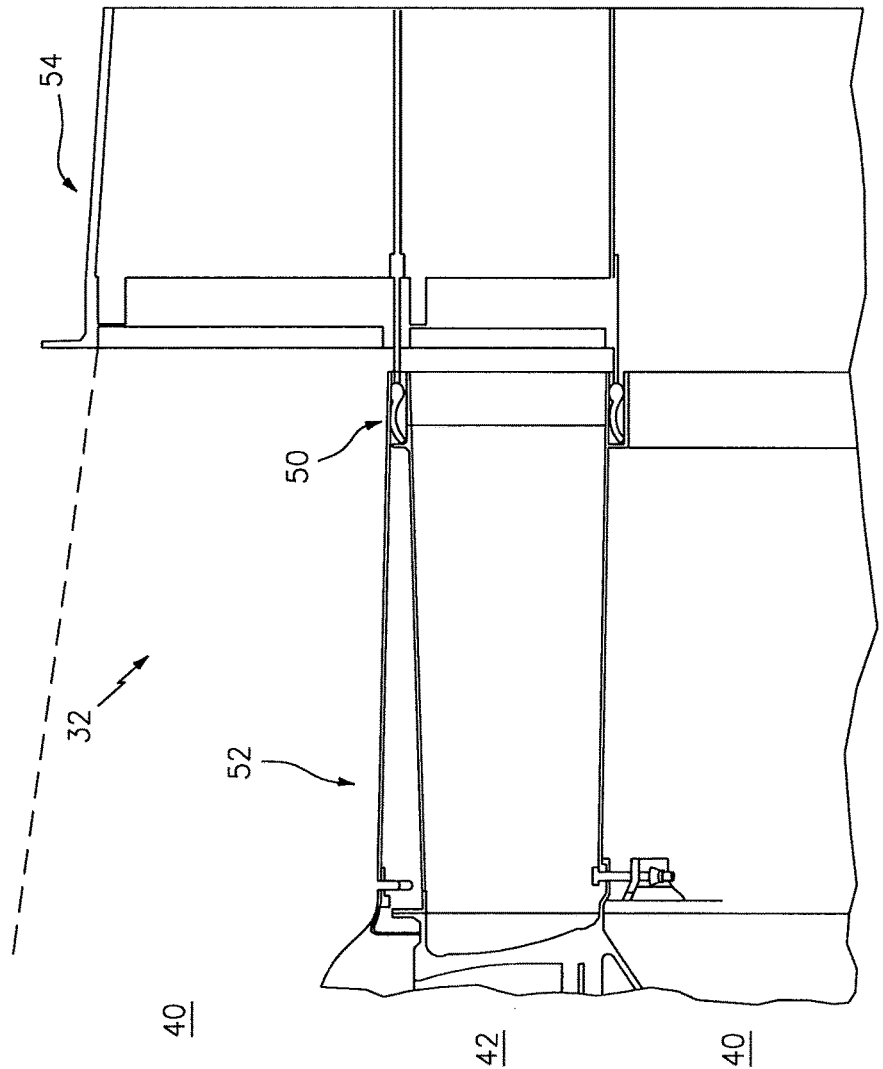
FIG. 6 is a longitudinal cross section of an engine to exhaust system interface according to one non-limiting embodiment.

With reference to FIG. 6, to accommodate the thermal growth within the exhaust duct section 32, a seal assembly 50 is mounted therein between a first exhaust duct section 52 and a second exhaust duct section 54 for each of the primary airflow in the primary airflow path 42 and the secondary airflow through the secondary airflow path 40. It should be appreciated that although each seal assembly 50 is located at similar axial positions, other arrangements as well as additional seal assemblies for additional airflow streams such as third stream airflow typical of variable cycle engine architectures may alternatively or additionally provided.

The adjacent exhaust duct sections 52, 54 have, for example, relatively large axial displacements greater than about 0.5 (12.7 mm) inches and relatively large radial displacements greater than about 0.125 inches (6.4 mm) in a high temperature environment while requiring sealing between the primary airflow in the primary airflow path 42 and the secondary airflow through the secondary airflow path 40 which operate at differential pressures.

Figure 8:
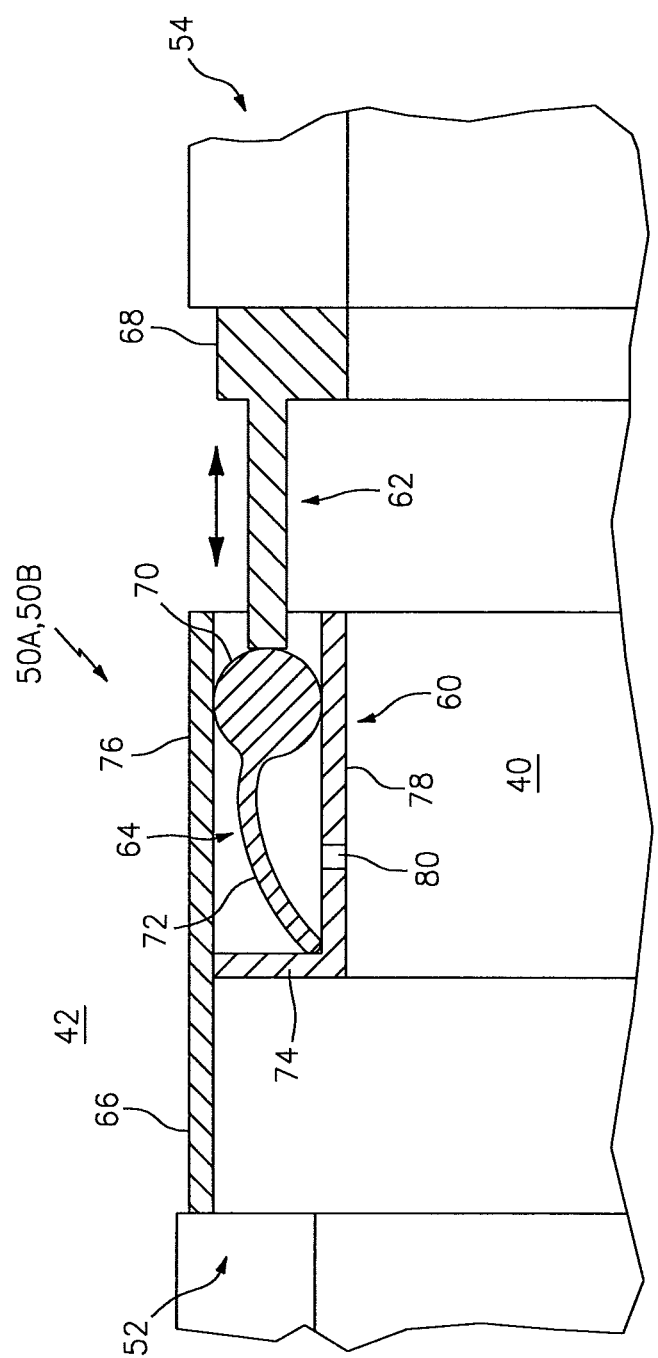
FIG. 8 is an expanded longitudinal cross section of a seal assembly according to one non-limiting embodiment.

With reference to FIG. 8, in one disclosed non-limiting embodiment, each seal assembly 50 generally includes a channel 60, a faying extension 62 and a tadpole seal 64. It should be appreciated that various arrangements may alternatively or additionally be provided.

The channel 60 is mounted to an aft section 66 of the first exhaust duct section 52 and extends downstream therefrom. The faying extension 62 is mounted to a forward section 68 of the second exhaust duct section 54 and extends upstream therefrom to at least partially extend into the channel 60 which contains the tadpole seal 64.

The tadpole seal 64, for example, may include a silica cover wrapped around an Inconel mesh bulb core such as McMaster-Carr P/N 8853K13. The example tadpole seal 64 offers higher temperature resistance than fiberglass seals and the Inconel insert provides added strength. The example tadpole seal 64 resists contaminates and seals at temperatures up to about 1700° F. The tadpole seal 64 is readily cut to length, for example, via a laser which fuses end section edges thereof. The tadpole seal 64 may be installed as a strip or, alternatively, the end sections may be fused together to form a complete ring.

The tadpole seal 64 generally includes a bulb 70 and a tail 72. The tadpole seal 64 is located within the channel 60 with the tail 72 directed upstream in the channel 60. The faying extension 62 engages the bulb 70 to provide the seal. The bulb 70 translates axially when compressed by the deflection/displacement of the faying extension 62 as the exhaust duct sections 52, 54 grow toward each other under thermal expansion. That is, as the engine 20 and the nozzle section 34 are fixed to the airframe W (see FIG. 7), any thermal growth is accommodated within the seal assembly 50 as the exhaust duct sections 52, 54 grow toward each other under thermal expansion.

The tail 72 of the tadpole seal 64 essentially operates as a low rate spring to keep the primary sealing surface (e.g., the bulb 70) engaged. As the faying extension 62 deflects/displaces radially, contact is maintained with the bulb 70. The tail 72 remains in contact with a backwall 74 of the channel 60 to maintain a secondary sealing surface. That is, the tail 72 may remain in contact with a backwall 74 of the channel 60 throughout the relative axial displacement between the exhaust duct sections 52, 54. The backwall 74 extends radially between a radial out wall 76 and a radial inner wall 78 which together form an open annulus directed axially aft.

In another disclosed non-limiting embodiment, one or more ports 80 are located in the channel 60 upstream of the bulb 70 to provide pressure balance. That is, the ports 80 upstream of the bulb 70 permit the pressure from within the respective primary airflow path 42 and the secondary airflow path 40 to enter the channel 60 and effectively increase the preload provided by the tail 72.

Figure 9:
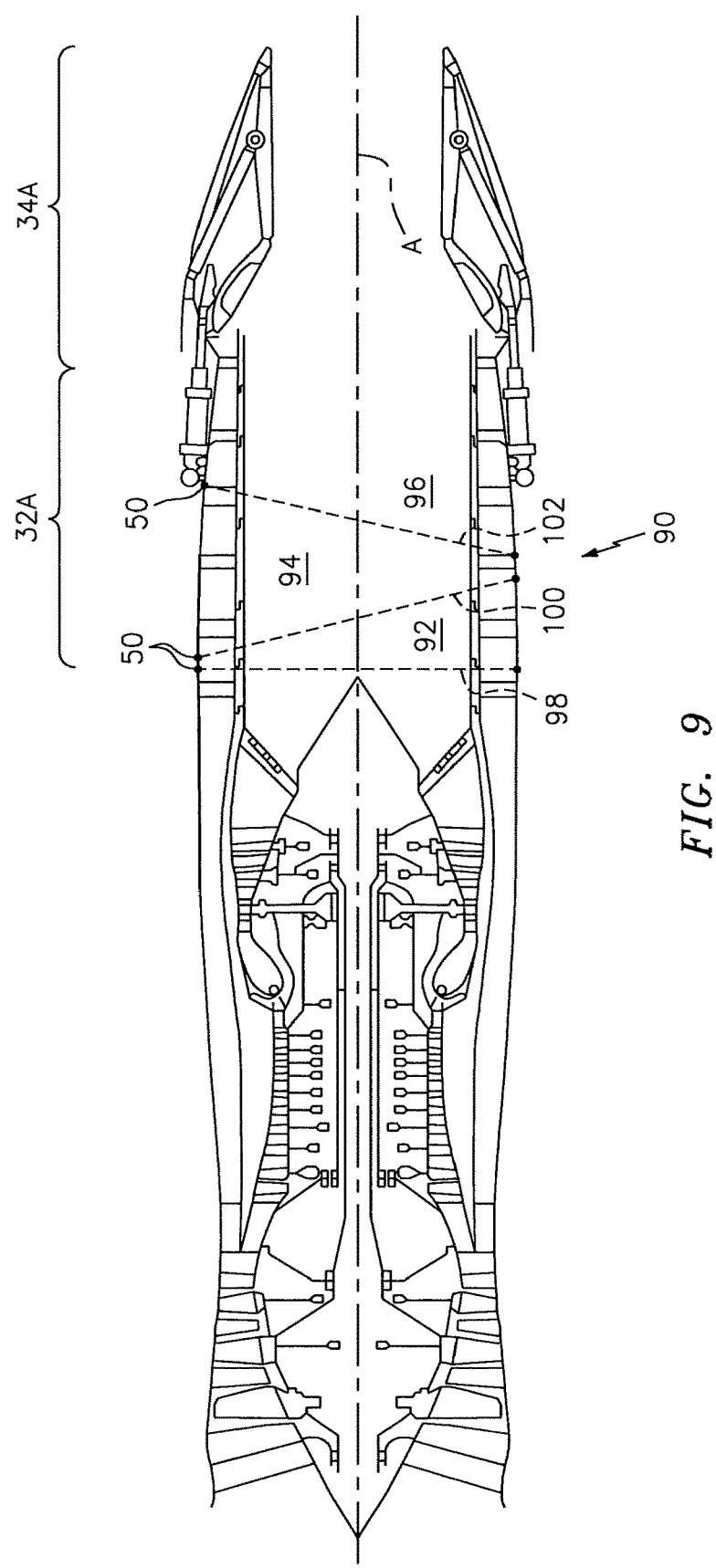
FIG. 9 is a general schematic view of an exemplary gas turbine engine with an exhaust duct according to another non-limiting embodiment.
Figure 10:
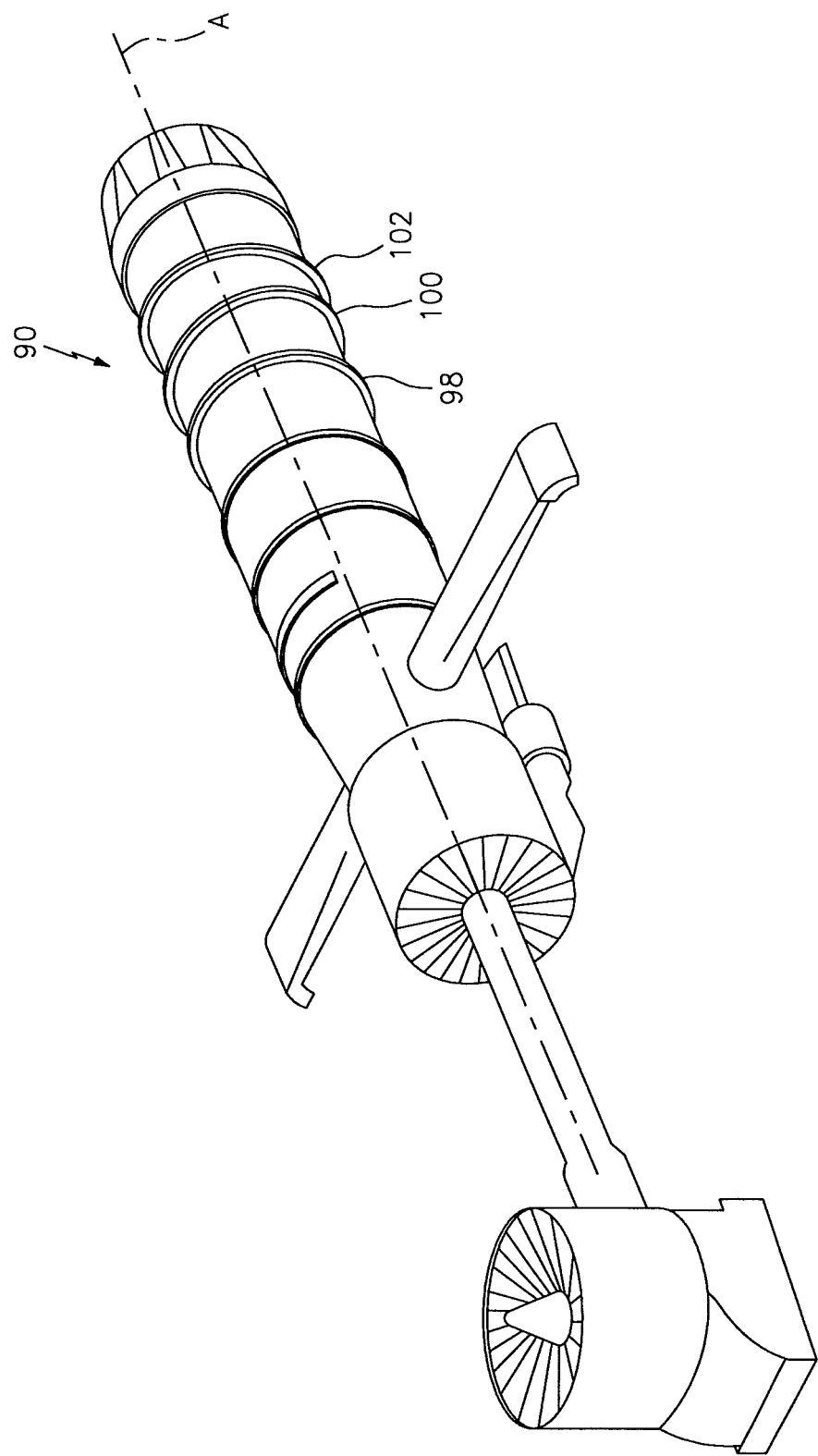
FIG. 10 is a general schematic view of the exhaust duct of FIG. 9 in a first position.
Figure 11:
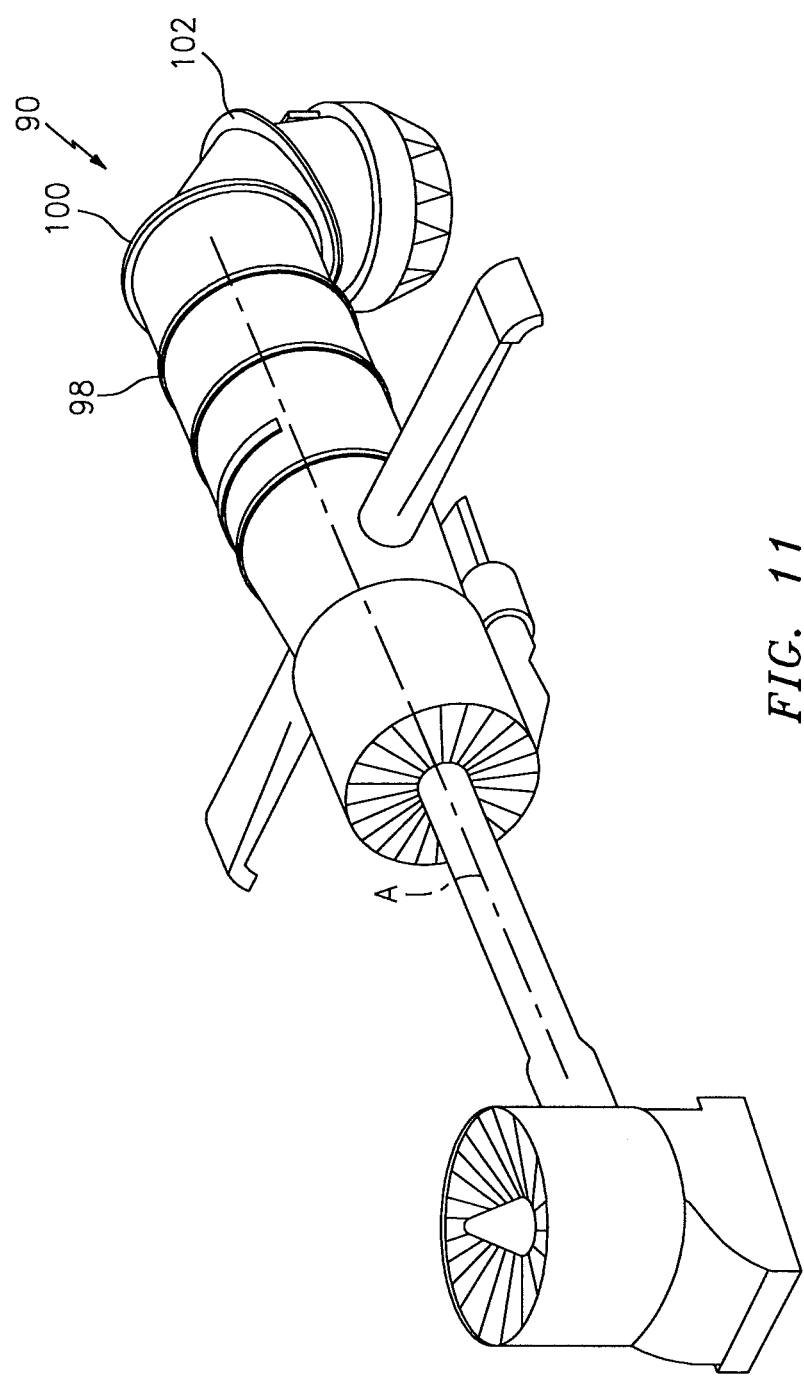
FIG. 11 is a general schematic view of the exhaust duct of FIG. 9 in a second position.

With reference to FIG. 9, an exhaust duct section 32A, in another disclosed non-limiting embodiment, includes a three-bearing swivel duct (3BSD) 90 (illustrated schematically) for use in a short take off vertical landing (STOVL) type of aircraft. The 3BSD 90 includes three exhaust ducts 92, 94, 96 which rotate relative to each other about three bearing planes 98, 100, 102 to permit transition between a cruise configuration (see FIG. 10) in which the 3BSD 90 is arranged along the central longitudinal engine axis A and a hover configuration (see FIG. 11) in which the 3BSD 90 articulates the nozzle section 34A to a position transverse to the central longitudinal engine axis A. It should be appreciated that the three exhaust ducts 92, 94, 96 need not be of circular section provided that the profiles in the three bearing planes 98, 100, 102 remain circular. Each of the three bearing planes 98, 100, 102 includes a respective seal assembly 50 as above described. Each seal assembly 50 operates to seal the 3BSD 90 yet permits relative rotation.

The seal assembly 50 accommodates significant displacements, is relatively uncomplicated with machined or spun seal cavities and laser cut tadpole seals that advantageously reduces weight. The seal assembly 50 is readily applicable to complex geometries and is easily maintainable as the tadpole seal is fully contained at assembly and fully removable when parts are separated.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An exhaust duct for a gas turbine engine, comprising:
a first exhaust duct section;
a second exhaust duct section adjacent to the first exhaust duct section;
a seal assembly between the first exhaust duct section and the second exhaust duct section, wherein the seal assembly includes a tadpole seal with a bulb and a tail, and the tail is directed upstream;
wherein the bulb is configured to translate axially when compressed by movement of a component of the seal assembly; and
a channel mounted to the first exhaust duct section, wherein the tadpole seal is located within the channel;
wherein the tail extends toward a backwall of the channel;
wherein the component of the seal assembly comprises a faying extension that at least partially extends axially into the channel and into axial contact with the bulb; and
wherein the component of the seal assembly comprises a faying extension that at least partially extends axially into the channel and into axial contact with the bulb.

2. The exhaust duct as recited in claim 1, wherein the channel defines at least one port upstream of the bulb.

3. The exhaust duct as recited in claim 1, wherein the tadpole seal defines a ring.

4. The exhaust duct as recited in claim 1, wherein the tadpole seal includes laser cut end sections.

5. The exhaust duct of claim 1, wherein the tadpole seal comprises a silica cover wrapped around an Inconel mesh bulb core.

6. An exhaust duct for a gas turbine engine, comprising:
a first exhaust duct section;
a second exhaust duct section adjacent to the first exhaust duct section; and
a seal assembly between the first exhaust duct section and the second exhaust duct section, the seal assembly comprising a tadpole seal and a faying extension attached to the second exhaust duct section;
the tadpole seal comprising a bulb and a tail that is directed upstream;
the faying extension projecting upstream to a distal end that axially engages the bulb, wherein the bulb is axially between the faying extension and the tail.

7. The exhaust duct of claim 6, wherein the seal assembly further comprises a channel mounted to the first exhaust duct section, and the tadpole seal is located within the channel.

8. The exhaust duct of claim 7, wherein the tail extends toward a backwall of the channel.

9. The exhaust duct of claim 8, wherein the faying extension extends at least partially axially into the channel.

10. The exhaust duct of claim 9, wherein the channel is configured with a port upstream of the bulb.

11. The exhaust duct of claim 6, wherein the tadpole seal defines a ring.

12. The exhaust duct of claim 6, wherein the tadpole seal includes laser cut end sections.

13. The exhaust duct of claim 6, wherein the tadpole seal comprises a silica cover wrapped around a metal mesh core.

14. The exhaust duct of claim 6, wherein the tadpole seal comprises a cover wrapped around a mesh core.

\* \* \* \* \*